(12) United States Patent
Choi et al.

(10) Patent No.: US 10,222,831 B2
(45) Date of Patent: Mar. 5, 2019

(54) DISPLAY APPARATUS

(71) Applicant: SAMSUNG DISPLAY CO., LTD., Yongin-si, Gyeonggi-do (KR)

(72) Inventors: Wonil Choi, Ansan-si (KR); Wonsang Park, Yongin-si (KR)

(73) Assignee: Samsung Display Co., Ltd., Yongin-si, Gyeonggi-do (KR)

(*) Notice: Subject to any disclaimer, the term of this patent is extended or adjusted under 35 U.S.C. 154(b) by 543 days.

(21) Appl. No.: 14/943,045

(22) Filed: Nov. 17, 2015

(65) Prior Publication Data

US 2016/0209878 A1 Jul. 21, 2016

(30) Foreign Application Priority Data

Jan. 16, 2015 (KR) .................. 10-2015-0008248

(51) Int. Cl.
*G06F 1/16* (2006.01)
*F16H 1/20* (2006.01)

(52) U.S. Cl.
CPC .......... *G06F 1/1641* (2013.01); *G06F 1/1601* (2013.01); *F16H 1/203* (2013.01); *G06F 2200/1612* (2013.01)

(58) Field of Classification Search
CPC .... G06F 1/1601; G06F 1/1618; G06F 1/1622; G06F 1/1641
See application file for complete search history.

(56) References Cited

U.S. PATENT DOCUMENTS

| | | |
|---|---|---|
| 2008/0144265 A1 | 6/2008 | Aoki |
| 2010/0002402 A1 | 1/2010 | Rogers et al. |
| 2010/0177020 A1 | 7/2010 | Bemelmans et al. |
| 2010/0232094 A1 | 9/2010 | Chen |
| 2010/0295761 A1 | 11/2010 | Van Lieshout et al. |
| 2013/0021762 A1 | 1/2013 | Van Dijk et al. |
| 2013/0058063 A1 | 3/2013 | O'Brien |
| 2016/0187929 A1* | 6/2016 | Kim ..................... G06F 1/1652 345/184 |
| 2017/0360170 A1* | 12/2017 | Lin ....................... G06F 1/1641 |

FOREIGN PATENT DOCUMENTS

| | | |
|---|---|---|
| KR | 10-2011-0048705 A | 5/2011 |
| KR | 10-2014-0054498 A | 5/2014 |

* cited by examiner

*Primary Examiner* — Dennis P Joseph
(74) *Attorney, Agent, or Firm* — Lee & Morse, P.C.

(57) ABSTRACT

A display apparatus includes a stretchable display panel, a plurality of movable surfaces adjacent the display panel, an actuator connected to rotate the movable surfaces in a direction, and a plurality of case sections accommodating the movable surfaces and the actuator. The case sections are connected to a border of the display panel. The movable surfaces rotate about a center axis in a predetermined region in order to push the case sections in an outward direction.

11 Claims, 14 Drawing Sheets

DISPLAY APPARATUS

CROSS-REFERENCE TO RELATED APPLICATION

Korean Patent Application No. 10-2015-0008248, filed on Jan. 16, 2015, and entitled, "Display Apparatus," is incorporated by reference herein in its entirety.

BACKGROUND

1. Field

One or more embodiments described herein relate to an a display apparatus.

2. Description of the Related Art

One type of flexible display has metal wiring formed on a stretchable substrate made of polydimethylsiloxane. The metal wiring has a wave shape when the substrate contracts and spreads out when the substrate is stretched. In another type of flexible display, the metal wiring is replaced by a conductive stretchable material such as conductive polymer, carbon nanotube, or graphene.

SUMMARY

In accordance with one or more embodiments, a display apparatus includes a stretchable display panel; a plurality of movable surfaces adjacent the display panel; an actuator connected to rotate the movable surfaces in a direction; and a plurality of case sections accommodating the movable surfaces and the actuator, the case sections connected to a border of the display panel, the movable surfaces to rotate about a center axis in a predetermined region in order to push the case sections in an outward direction.

The display panel may have a substantially a circular shape. Each of the movable surfaces may have substantially a water drop shape or a polygonal shape. The display panel may include a display region to display an image; and a non-display region adjacent the display region and accommodated in the case sections. The actuator may include a plurality of rotators connected to each other. Each of the rotators may include at least one gear connected to and to rotate a corresponding one of the movable surfaces.

Each of the rotators may include a first gear having a plate shape connected to a lower surface of one of the movable surfaces and a second gear having a plate shape adjacent to the first gear, and the first and second gears may be horizontally and alternately disposed in a circumferential direction. The first gear may include a side surface with first protrusions, and the second gear may include a side surface with second protrusions which engage the second protrusions.

At least one of the rotators may include a power driver to impart power to the rotators. Each of the rotators may include a first support to support the first gear and a second support to support the second gear, and the power driver may be connected to the first support of at least one of the rotators. The power driver may include a driver to provide the power; a third gear having a plate shape substantially perpendicular to the first gear; a third support to support the third gear; and a power transfer arrangement to transfer the power from the power driver to the third gear, the third gear to transfer the power from the power transfer arrangement to the first gear. The third gear may include a side surface with third protrusions that engage the first protrusions.

The display apparatus may include a guide under the actuator, wherein the guide includes a first region having a circular border including the actuator, a second region at a center of the region surrounded by the first region, and a third region between the first and second regions and including a plurality of holes extending from the second region toward the first region. The case sections may include a plurality of respective upper cases accommodating the non-display region of the display panel; and a plurality of respective lower cases under the upper cases and accommodating the movable surfaces, the actuator, and the guide, wherein the upper and lower cases have substantially circular frame shapes.

The upper cases may include a plurality of respective outer cases connected to the lower cases, and a plurality of respective inner cases inside the outer cases, the outer cases are respectively connected to the inner cases to have integrated shapes, and the inner cases may be drawn out from the outer cases and exposed when the display panel is stretched.

The outer case may include a first opening at a side surface of the outer case facing the display region of the display panel; and a first accommodating region adjacent the first opening and disposed inside the outer case, wherein: the inner case is in the first accommodating region and includes a second accommodating region extending from a side surface of the inner case facing the display region of the display panel to the inside of the inner case, and the non-display region of the display panel passes through the first opening and is inserted into the second accommodating region.

The outer cases and the lower cases may move toward the outer side of the case sections when the display panel is stretched; as the outer and lower cases move toward the outer side of the case sections, adjacent ones of the outer cases and adjacent ones of the lower cases may space apart from each other; and as the outer cases space apart from each other, the inner cases may be drawn out from the outer cases to connect the outer cases.

The outer case may have an inner side surface with an embossed protrusion; the inner case may have an outer side surface with an engraved groove; and the embossed protrusion and the groove may extend in a circumferential direction of the outer case and the protrusion may engage the groove. The lower case may include a bottom accommodating the first region of the guide and extending in a horizontal direction; a side wall at a first side of the bottom in a radial direction and extending upwardly to connect to an outer side of the outer case; and a catching protrusion at a second side of the bottom in the radial direction and protruding upwardly, wherein: the catching protrusion is inserted into the holes of the guide, and as the case sections space apart in an outward direction, the catching protrusion is to move from the second side to the first side of the radial direction in the holes.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
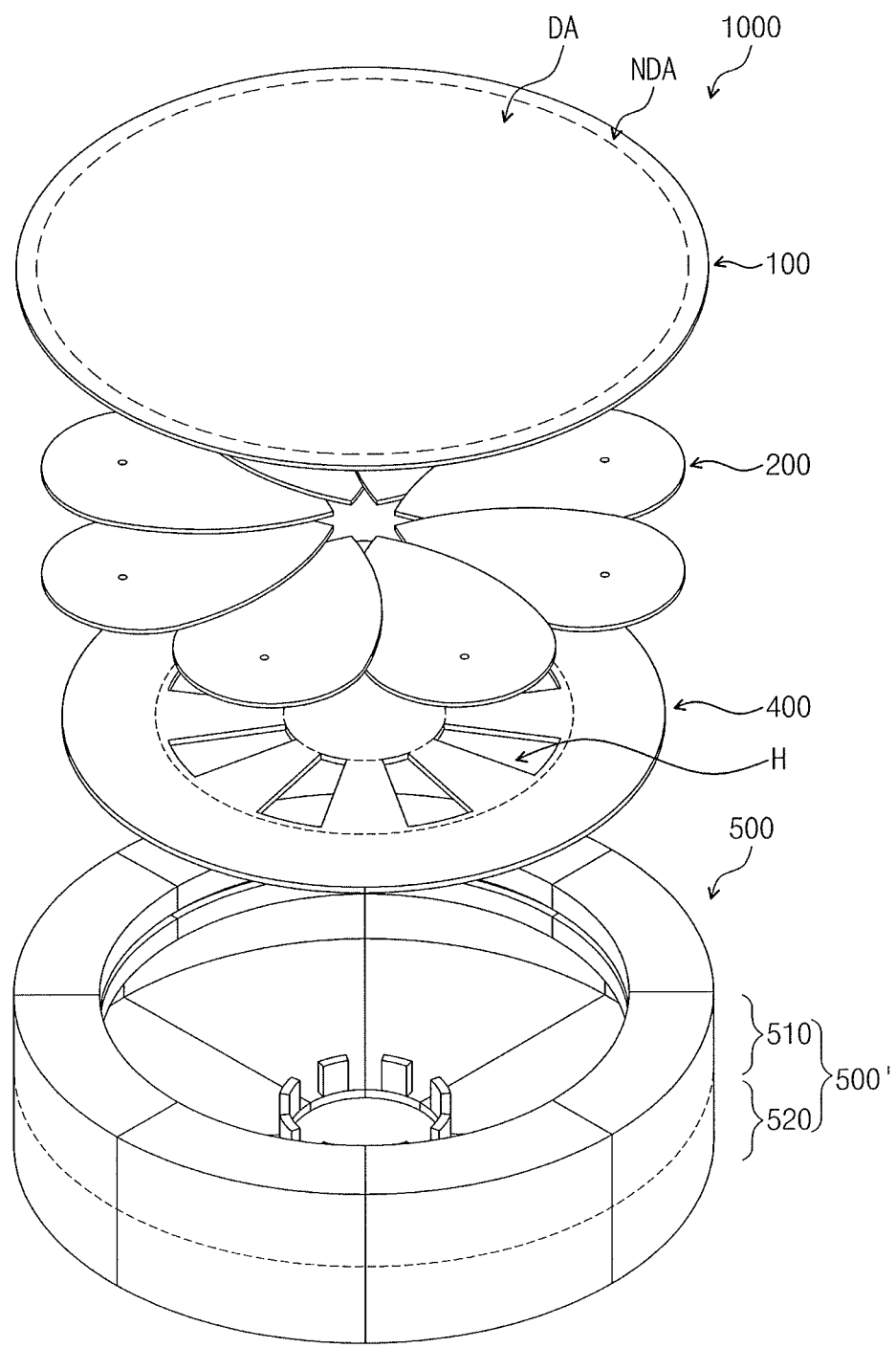
FIG. 1 illustrates an embodiment of a display apparatus.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
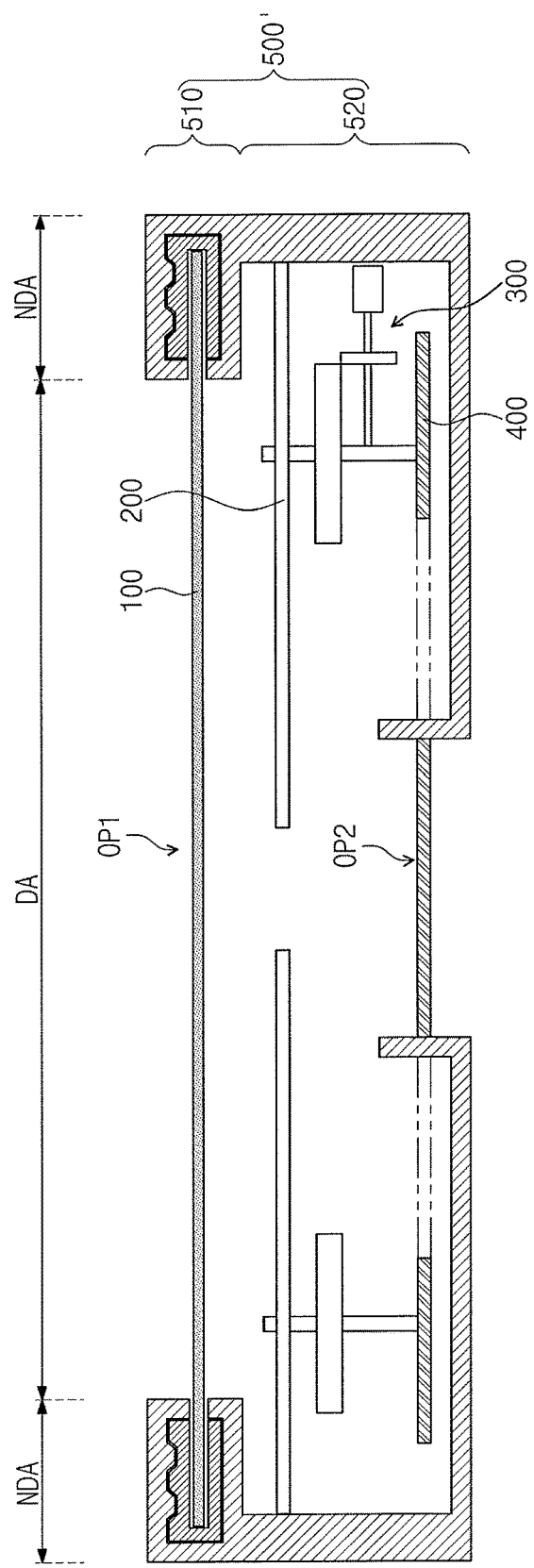
FIG. 2 illustrates another view of the display apparatus.

FIG. 1 illustrates an embodiment of a display apparatus 1000, and FIG. 2 is a side cross-sectional view of the display apparatus 1000. Referring to FIGS. 1 and 2, the display apparatus 1000 includes a display part or panel 100, a plurality of movable members 200, a rotation part or actuator 300, a guide part 400, and a case part 500.

The display part 100 has stretchability. For example, the display part 100 may include a substrate having stretchability and electronic elements are disposed on the substrate. According to one embodiment, the display part 100 may have a circular shape. In another embodiment, the display part 100 may have a different shape, e.g., a polygonal shape, elliptical shape, or another shape.

The display part 100 includes a display region DA for displaying images and a non-display region NDA adjacent the display region DA. A plurality of pixels are in the display region DA, and a pixel driver for driving the pixels may be in the non-display region NDA. The non-display region NDA may be in a case part 500 connected to the display part 100. The case part 500 and the display part 100 stretch in at least one predetermined direction.

The movable members 200 are under the display part 100 and are disposed at predetermined (e.g., equal) intervals in a circumferential direction of display part 100. Each movable member 200 may include a plate having a predetermined shape, e.g., a water drop shape, an elliptical shape, a polygonal shape, or another shape. According to one embodiment, the movable members 200 partially overlap in predetermined regions.

The rotation part 300 is under the movable members 200 and includes a plurality of rotating units 300' connected to the movable members 200, respectively. The movable members 200 may be rotated in a predetermined direction by respective ones of the rotating units 300'.

The guide part 400 is under the rotation part 300 to support the rotation part 300. The guide part 400 may be a plate having a predetermined (e.g., circular) shape with a plurality of holes H.

The case part 500 accommodates the non-display region NDA of the display part 100, the movable members 200, the rotation part 300, and the guide part 400. The case part 500 has a predetermined (e.g., circular) frame shape. The case part 500 includes a plurality of case units 500' adjacent to each other in a circular frame shape.

Each case unit 500' includes an upper case 510 and a lower case 520. The upper cases 510 are connected to the lower cases 520, respectively. The upper cases 510 contact each other to form a circular frame. The upper cases 510 accommodate the non-display region NDA of the display part 100. A first open region OP1 is in an inner region of the circular frame formed by the upper cases 510. The display region DA of the display part 100 may be exposed through the open region OP1 to allow for viewing of images in the display region DA by a user.

The lower cases 520 contact each other and may have, for example, an integral shape. For example, outer walls of the lower cases 520 contact each other to form a circular frame at an outermost portion. The movable members 200, the rotation part 300, and the guide part 400 may be accommodated in an inner region of the circular frame of the lower cases 520. A second open region OP2 is formed at a central part of the inner region of the circular frame of the lower cases 520. A predetermined region on a rear surface of the guide part 400 may be exposed through the second open region OP2. Since an upper surface of the guide part 400 is covered by the display region DA of the display part 100, the upper surface of the guide part 400 is not exposed. The first and second open regions OP1 and OP2 may expand as the display part 100 is stretched.

Figure 3A:
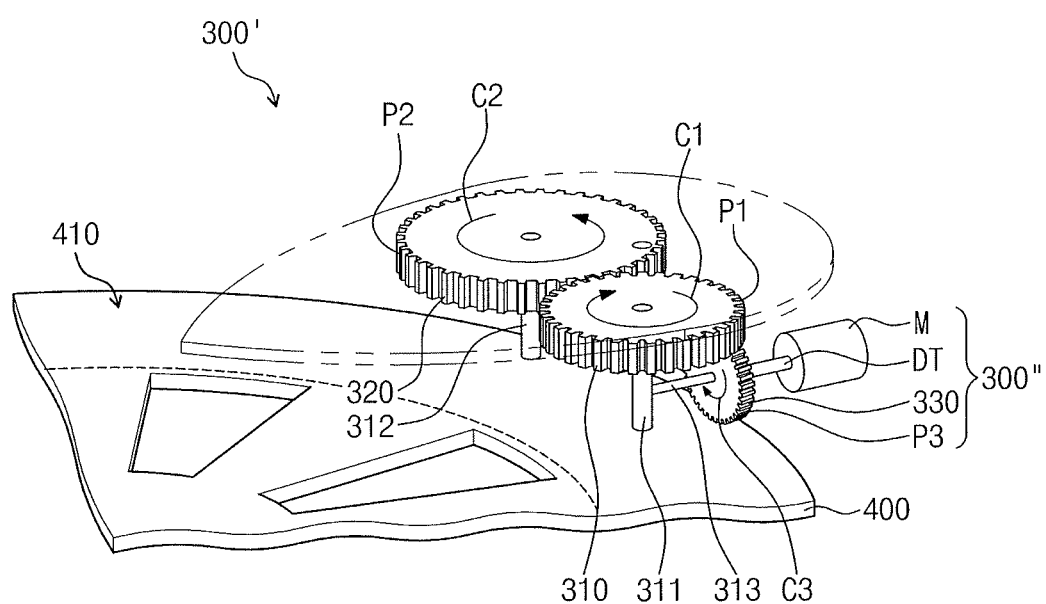
FIG. 3A-3C illustrate an embodiment of a movable member and a rotation part.
Figure 3B:
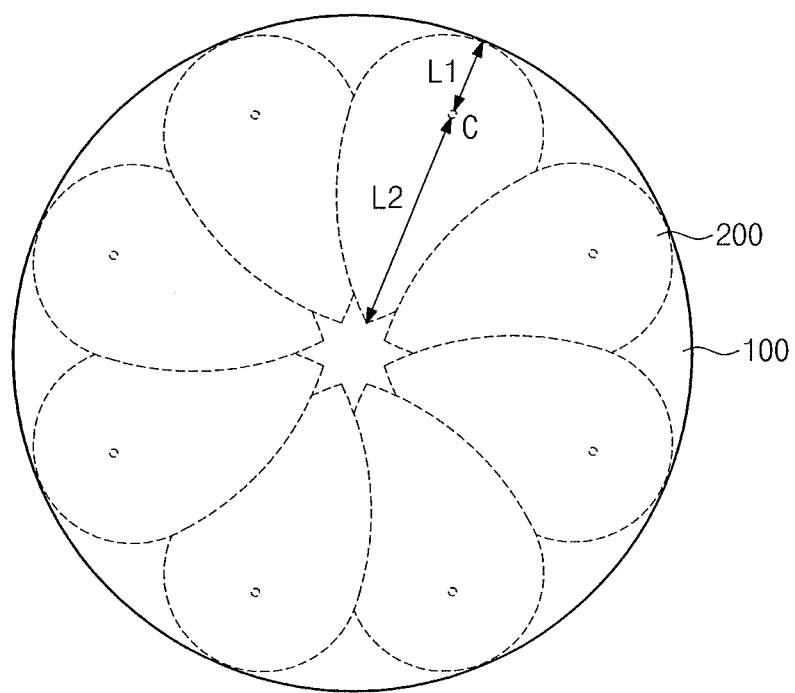
Figure 3C:
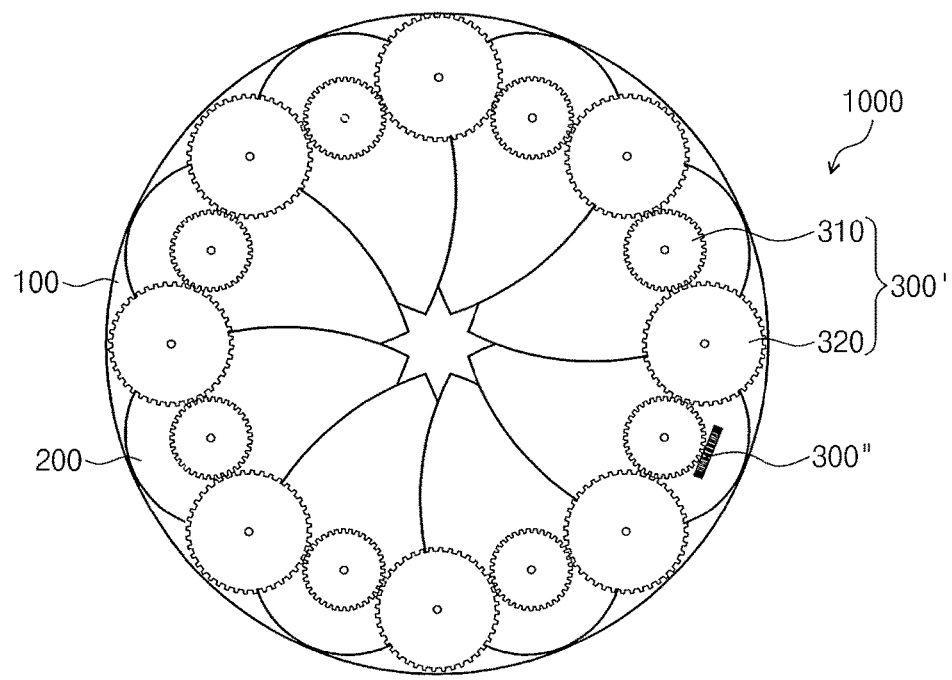

FIG. 3A is a perspective view of one of the movable members 200 and one of the rotating units 300'. FIG. 3B is a front view of the movable members 200 and the rotation part 300. FIG. 3C is a rear view of the movable members 200 and the rotation part 300.

Referring to FIGS. 3A-3C, each of the rotating units 300' includes a first gear 310, a second gear 320, a first support member 311, and a second support member 312. The first and second gears 310 and 320 have plate shapes, e.g., circular plate shapes. A side surface of each of the first and second gears 310 and 320 may be oriented in a horizontal direction.

The first and second support members 311 and 312 have rod shapes that extend in an upward/downward direction. The first and second support members 311 and 312 are respectively disposed on rotational center axes of the first and second gears 310 and 320, respectively. The first and second support members 311 and 312 support the first and second gears 310 and 320. For example, the first support member 311 has a first side connected to the rotational center axis of the first gear 310 on the rear surface of the first gear 310, and a second side adjacent and/or fixed to the upper surface of the guide part 400. The second support member 312 has a first side connected to the rotational center axis of the second gear 310 on the rear surface of the second gear 320, and a second side adjacent and/or fixed to an upper surface of the guide part 400.

The first and second gears 310 and 320 are adjacent to each other. Accordingly, since a plurality of rotating units 300' are adjacent to each other, the first and second gears 310 and 320 are alternately disposed adjacent to each other in a circumferential direction of the display apparatus 1000. For example, the first gears 310 are disposed at equal intervals, and the second gears 320 are disposed between respective pairs of adjacent first gears 310. The first and second gears 310 and 320 contact each other.

In FIGS. 3A and 3B, the size of the first gear 310 is smaller than the second gear 320. In another embodiment, the first gear 310 may be larger than the second gear 320 or these gears may have the same size.

The first and second gears 310 and 320 include protrusions P1 and P2 on side surfaces. The protrusions P1 and P2 may have, for example, tooth shapes. The first protrusions P1 is on the side surface of the first gear 310, and the second protrusions P2 is on the side surface of the second gear 320. The first protrusions P1 of the first gear 310 contact and engage the second protrusions P2 of the second gear 320.

At least one rotating unit 300' may include a power part 300". The power part 300" to impart power to the rotation part 300. The power part 300" is connected to the first gear 310 or the second gear 320. In FIGS. 3A-3C, the power part 300" is connected to the first gear 310 for illustrative purposes.

The power part 300" includes a third gear 330, a third support member 313, a power driving part M and a power transfer part DT. The third gear 330 has a plate shape, e.g., a circular plate shape. The third gear 330 has a side surface that faces an upward/downward direction. The front surface of the third gear 330 faces an outer side of the guide part 400, and the rear surface of the third gear 330 faces the center of the guide unit 400. The front and rear surfaces of the third gear 330 are opposite surfaces.

The third support member 313 has a rod shape extending in a direction parallel to the movable member 200. The third support member 313 is oriented on a rotational center axis of the third gear 330 on the rear surface of the third gear 330. The third support member 313 may support the third gear 330. For example, the third support member 313 has a first side connected to the rotational center axis of the third gear 330 on the rear surface of the third gear 330, and a second side adjacent and/or fixed to the second support member 312. The third support member 313 may be arranged to be perpendicular to the second support member 312.

The third gear 330 is adjacent to the first gear 310. For example, the side surface of the third gear 330 is adjacent to the side surface of the first gear 310 in a direction perpendicular to the side surface of the first gear 310. The third gear 330 includes third protrusions P3 on a side surface that have tooth shapes. The third protrusions P3 of the third gear 330 contact and engage the first protrusions P1 of the first gear 310.

The third gear 330 is connected to the power driving part M and the power transfer part DT. For example, the power driving part M is connected to one side of the power transfer part DT to provide power to the power transfer part DT. The power driving part M may be a motor and is electrically and/or physically connected to the outside and therefore may be controlled from the outside. The other side of the power transfer part DT is connected to the third gear 330. The power transfer part DT transfers the power received from the power driving part M to the third gear 330. Accordingly, the third gear 330 may rotate about the third support member 313 serving as an axis.

As the third protrusions P3 of the third gear 330 engage the first protrusions P1 of the first gear 310, the torque of the third gear 330 is transferred to the first gear 310, and the first gear 310 rotates about the first support member 313 serving as an axis.

As the first protrusions P1 of the first gear 310 engage the second protrusions P2 of the second gear 320, the torque, transferred from the third gear 330 to the first gear 310, is transferred to the second gear 320. Accordingly, the second gear 320 rotates about the second support member 312 serving as an axis.

The second gear 320, which receives the torque, transfers the torque to the first gears 310 of two adjacent rotating units 300'. Thus, the first and second gears 310 and 320 are connected to each other to transfer and receive torque. As a result, the rotating units 300' are rotated by the third gear 330 based on power from the power driving part M and the power transfer part DT.

The first gears 310 of the rotating units 300' rotate in a first direction C1 and the second gears 320 rotate in a second direction C2. When the first and second gears 310 and 320 are viewed from the top, the first direction may be the clockwise direction and the second direction may be the counterclockwise direction.

The third gear 330 rotates in a third direction C3. When third gear 330 is viewed from the top, the third direction C3 may be the counterclockwise direction.

The movable members 200 are on the upper surfaces of the first gears 310. Accordingly, as the first gears 310 rotate, the movable members 200 are rotated about the rotational axes of the first gears 310.

In this embodiment, the movable members 200 are on or are coupled to the upper surfaces of the first gears 310. In another embodiment, the movable members 200 may also be on or coupled to the upper surfaces of the second gears 320. In this case, the movable members 200 rotate about the rotational axes of the second gears 320.

On a plate of each of the movable members 200, the center of mass C of the movable members 200 may be on or coupled to plates of respective ones of the movable members 200 and may be biased toward one side of the movable member 200, e.g., the movable member 200 may have eccentricity.

For example, in a radial direction of the display part 100, the movable member 200 may have a first side adjacent to the non-display region NDA of the display part 100 and a second side adjacent to the center of the display part 100. The radial direction may correspond to the direction of a line that extend from the center to a point on the circumference of the display part 100.

Referring to FIG. 3B, in the radial direction of the display part 100, a first distance L1 corresponds to the distance between one side end of the movable member 200 and the rotational center C of the movable member 200. A second distance L2 corresponds to the distance between the other side end of the movable member 200 and the rotational center C of the movable member 200. The first distance L1 may be shorter than the second distance L2. Accordingly, each of the movable members 200 may face the center of the display part 100.

Figure 4:
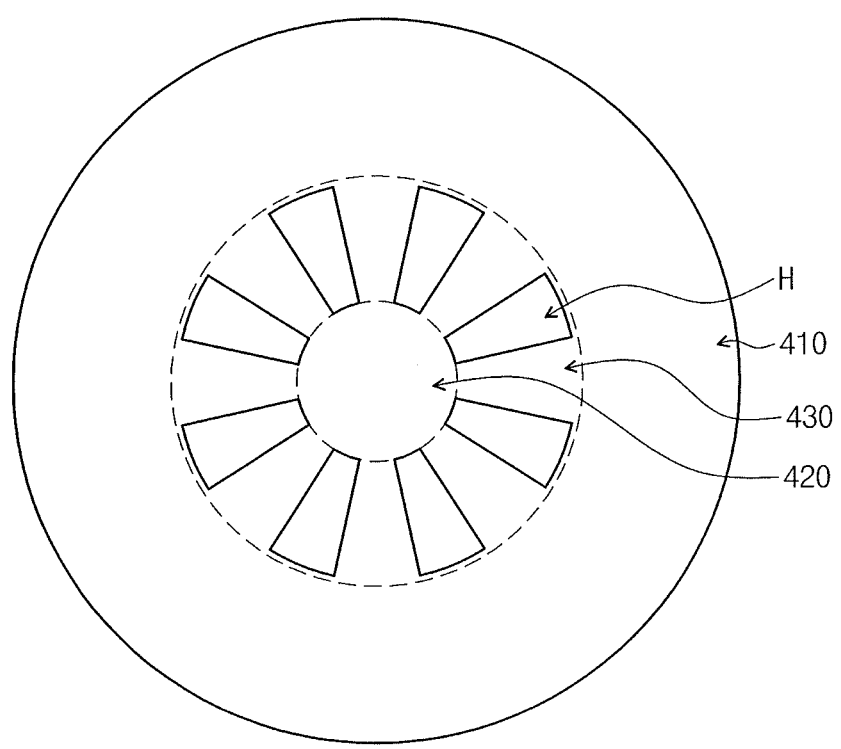
FIG. 4 illustrates an embodiment of a guide part.

FIG. 4 is a front view illustrating one embodiment of the guide part 400 which includes a first region 410, a second region 420, and a third region 430. The guide part 400 may have a circular plate shape. The first region 410 is at a border region of the guide part 400. The rotation part 300 may be on the first region 410. The second region 420 is at the center of the guide part 400 and has a predetermined (e.g., circular) shape. The third region 430 is between the first and second regions 410 and 420 and includes a plurality of holes H. The holes H have a predetermined (e.g., fan) shape. For example, the holes H have shapes which extend, like a fan, from the second region 420 to the first region 410. The holes H are disposed at equal intervals in the circumferential direction.

Figure 5A:
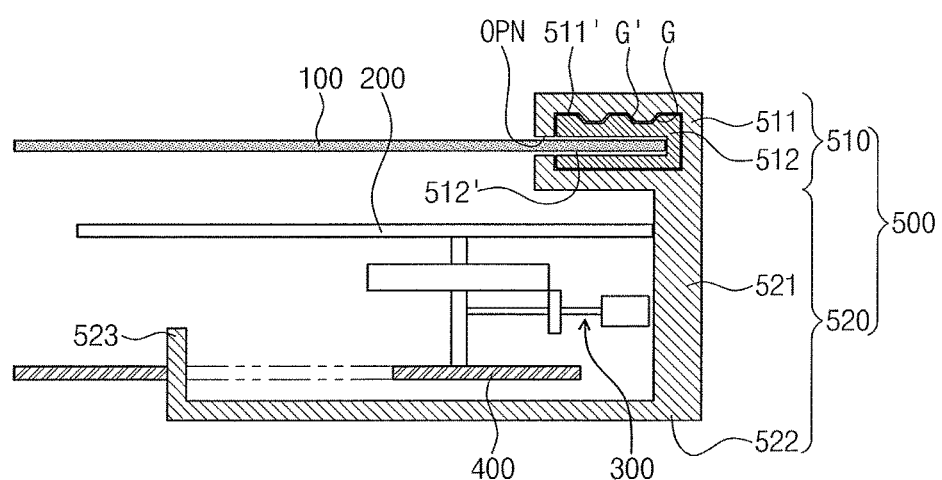
FIG. 5A-5C illustrate an embodiment of a case unit.
Figure 5B:
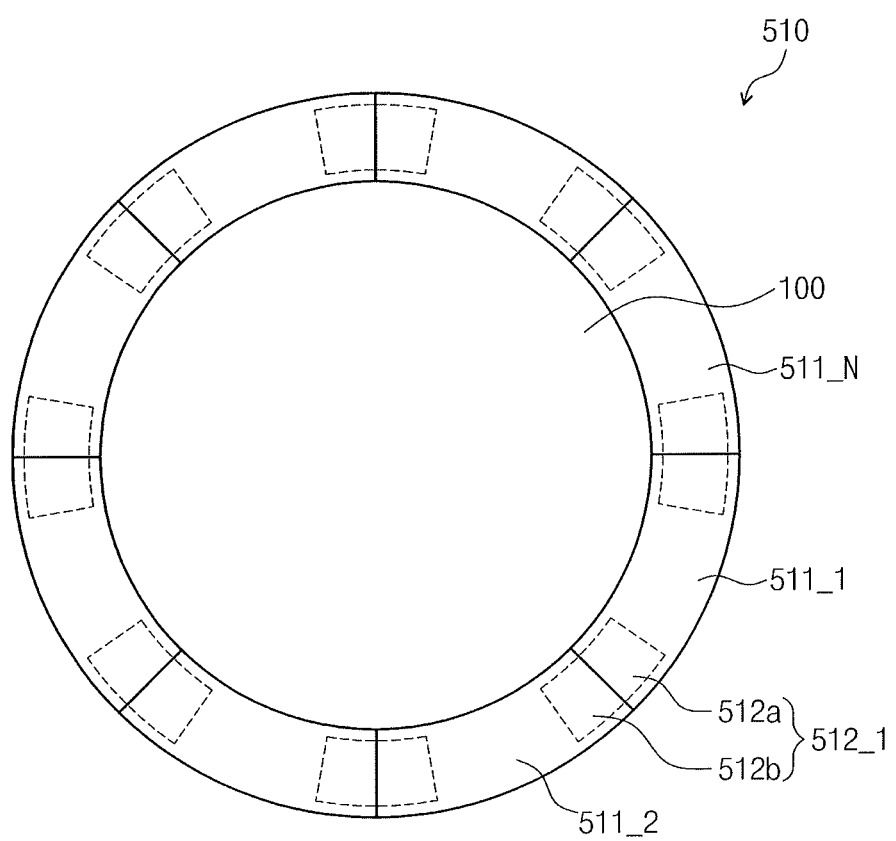
Figure 5C:
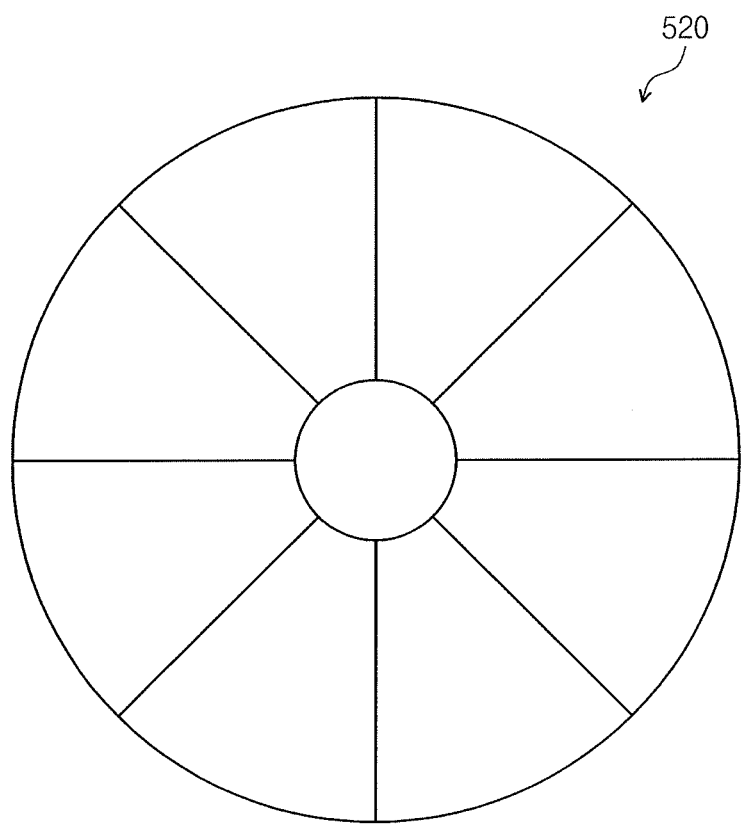

FIG. 5A is a side cross-sectional view of one of the case units 500'. FIG. 5B is a front view of the case unit 500'. FIG. 5C is a rear view of the case unit 500'. Referring to FIGS. 5A-5C, each case unit 500' includes the upper case 510 connected to the lower cases 520 to have an integral shape.

The upper cases 510 of the case units 500' are arranged and connected to form a circular frame. The upper cases 510 accommodate the non-display region NDA of the display part 100. Each upper case 510 includes an outer case 511 and inner case 512, with the inner case 512 inside the outer case 511. The outer case 511 includes an opening part OPN in a side surface which faces the display area DA of the display part 100. A first accommodating region 511' is inside the outer case 511. The opening part OPN in and/or adjacent to the first accommodating region 511'.

The inner case 512 is accommodated in the first accommodating region 511' of the outer case 511. The inner case 512 includes a second accommodating region 512' recessed from an inner side surface of the inner case 512 and aligned with the opening part OPN of the outer case 511. The non-display region NDA is inserted into the second accommodating region 512' through the opening part OPN. For example, the inner case 512 includes the second accommodating region 512' facing the opening part OPN of the outer case 511.

Referring to FIG. 5B, each inner case 512 is in two adjacent outer cases 511. For example, N upper cases 510 include N outer cases 511_1 to 511_N and N inner cases 512_1 to 512_N. Each of the inner cases 512_1 to 512_N includes a first region 512a and a second region 512b which, for example, may have equal size. The first region 512a of the first inner case 512_1 may be accommodated in the first outer case 511_1, and the second region 512b of the first inner case 512_1 may be accommodated in the second outer case 511_2. The first region 512a of the second inner case 512_2 may be accommodated in the second outer case 511_2, and the second region 512b of the second inner case 512_2 may be accommodated in the third outer case 511_3. The first region 512a of the Nth inner case 512_N may be accommodated in the Nth outer case 511_N, and the second region 512b of the Nth inner case 512_N may be accommodated in the first outer case 511_1. Thus, each inner case 512 may be accommodated in two outer cases 511 that are adjacent to each other. Accordingly, the outer cases 511 may be connected by the inner cases 512.

In one embodiment, the outer case 511 includes an embossed protrusion part G on an inside surface. The inner case 512 include an engraved groove part G' in an outside surface. The protrusion part G and the groove part G' extend in a circumferential direction. The protrusion part G engages the groove G'. Accordingly, the outside surface of the inner case 512 contacts the inside surface of the outer case 511, and thus the inner case 512 is accommodated inside the outer case 511.

When the display part 100 is stretched, a predetermined region of the inner case 512 is drawn out from the inside of the outer case 511. For example, a predetermined region of the inner case 512 may be drawn out from inside of the outer case 511 along the groove part G'.

The lower cases 520 accommodate the movable members 200, the rotation part 300, and the guide part 400. The lower cases 520 are respectively connected to the outer cases 510, for example, to have integral shapes. The lower case 520 extends toward a lower portion of the upper case 510.

For example, each of the lower cases 520 includes a side wall part 521 and a bottom part 522. An upper portion of the side wall part 521 is connected to an outer wall of the upper case 510. The side wall part 521 extends downward and is connected to one side of the bottom part 522 in the radial direction. The bottom part 522 extends in a horizontal direction. The first region 410 of the guide part 400 is disposed over the bottom part 522. A second opening region OP2 is in a central portion of the bottom part 522. The bottom part 522 includes a catching protrusion 523 adjacent to the second opening region OP2 in the radial direction. The catching protrusion 523 has the shape of an upwardly extending protrusion and is inserted into the hole H of the guide part 400.

Figure 6A:
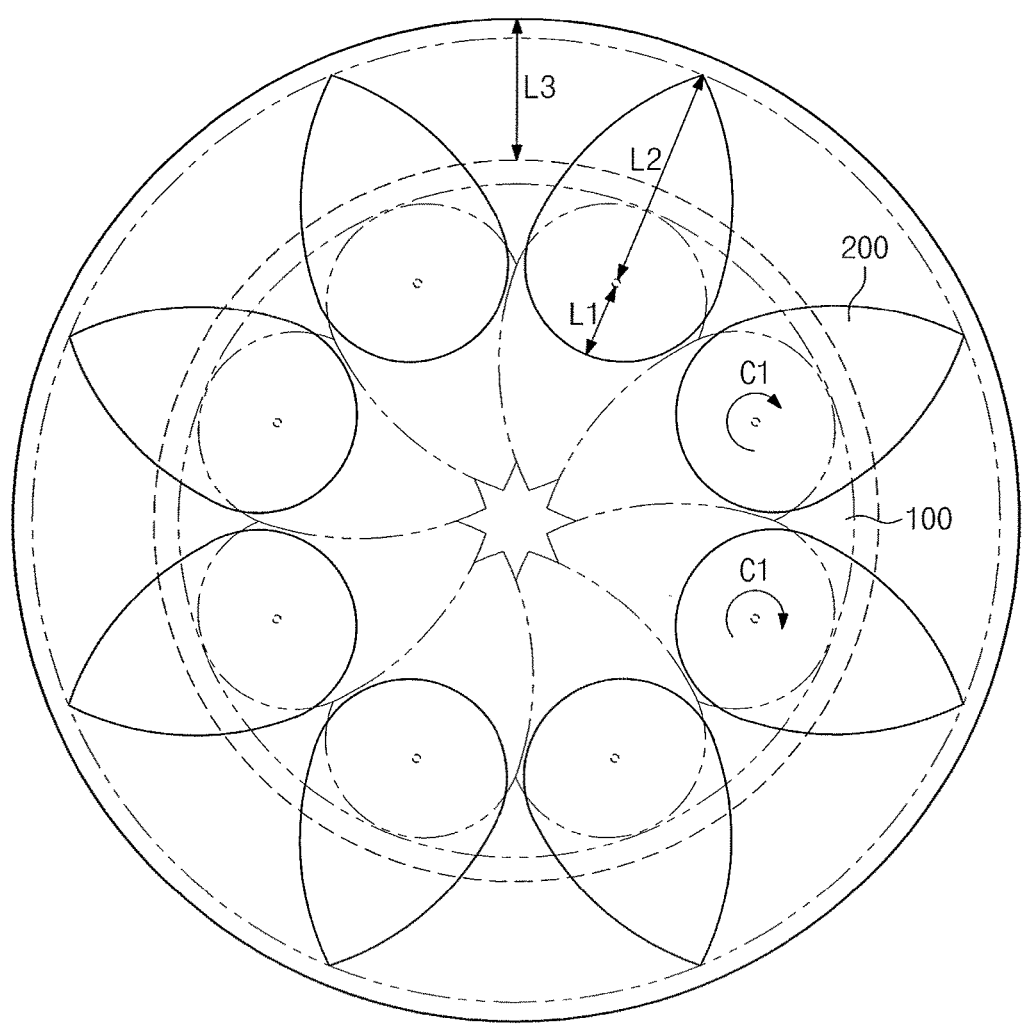
FIG. 6A-6B illustrate another embodiment of a movable member and rotation part.
Figure 6B:
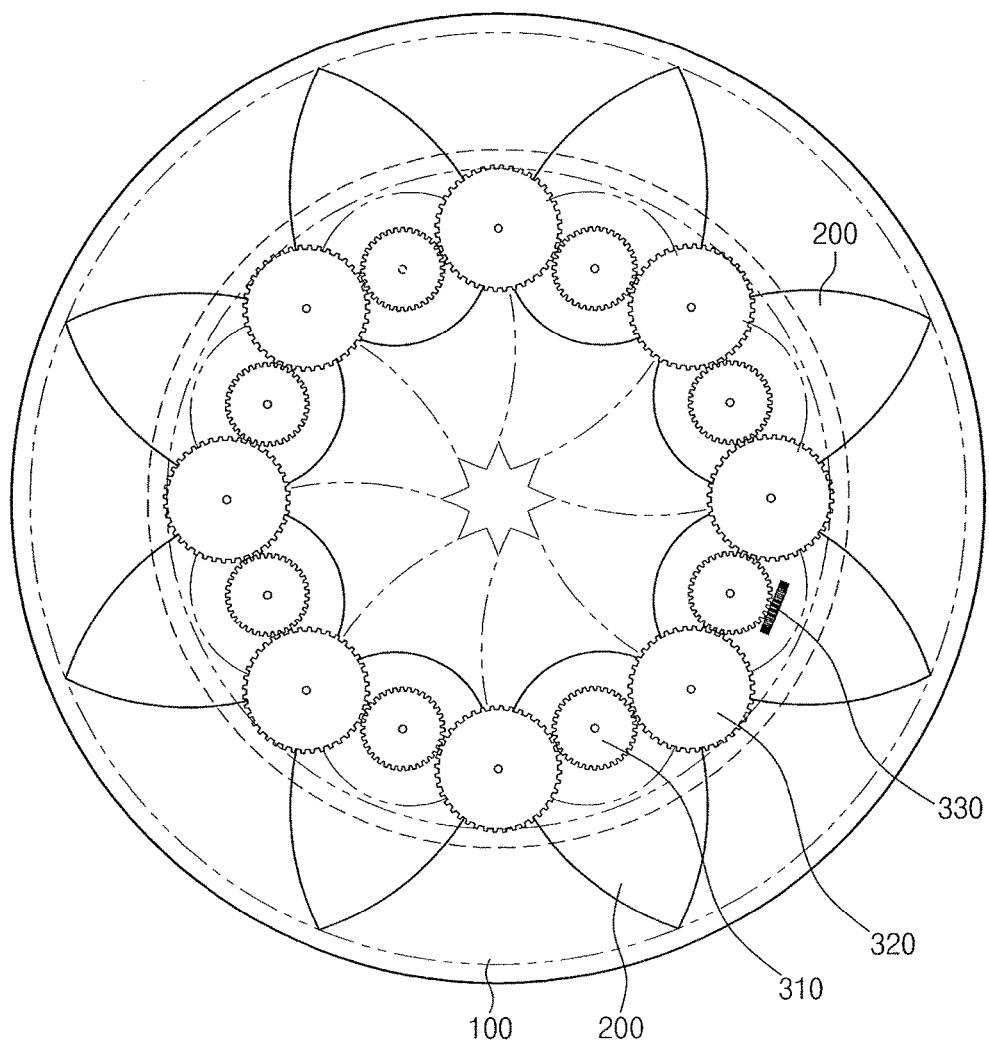

FIG. 6A is a front view of the movable members 200 and the rotation part 300 after the display apparatus is stretched. FIG. 6B is a rear view of the movable members 200 and the rotation part 300 after the display apparatus is stretched. Referring to FIGS. 6A and 6B, the movable members 200 are rotated by the rotation part 300, e.g., the movable members 200 may rotate a predetermined angle (e.g., 180 degrees) in a first direction C1. The movable members 200 may have, for example, shapes of petals in full bloom.

Figure 7:
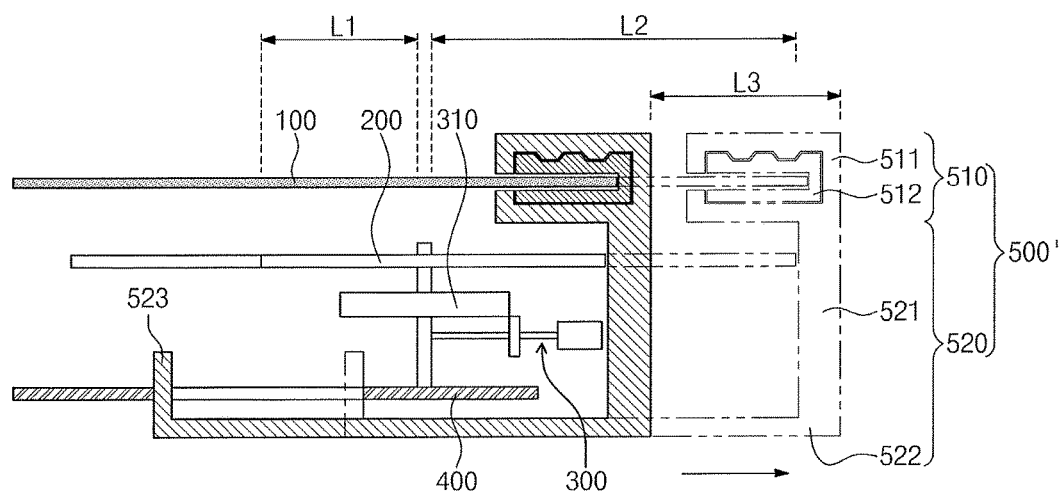
FIG. 7 illustrates an example operation of the display apparatus.

FIG. 7 illustrates a example of the operation of the display apparatus. Referring to FIG. 7, the movable member 200 is rotated by the first gear 310. The rotated movable member 200 pushes the case unit 500' toward the outside of the case unit 500'. The moving distance of the case unit 500' may be a third distance L3. The third distance L3 may be equal to the difference between the first distance L1 and the second distance L2.

As the case unit 500' is moved in a direction toward the outside thereof, the display part 100 is stretched. The stretched radial distance of the display part 100 is equal to the third distance L3. Also, as the case unit 500' is moved toward the outside thereof, the position of the catching protrusion 523 on the bottom part 522 of the lower case 520 may change. The catching protrusion 523 may be inserted into the hole H of the guide part 400. The length of the hole H in the radial direction may be equal to or greater than the third distance L3. For example, before the case unit 500' is moved, the catching protrusion 523 is adjacent to the second region 420 of the guide part 400. When the case unit 500' is moved toward the outside, the catching protrusion 523 moves in a direction from the second region 420 toward the first region 410 of the guide part 400. The moving distance of the catching protrusion 523 may be equal to the third distance L3.

Figure 8A:
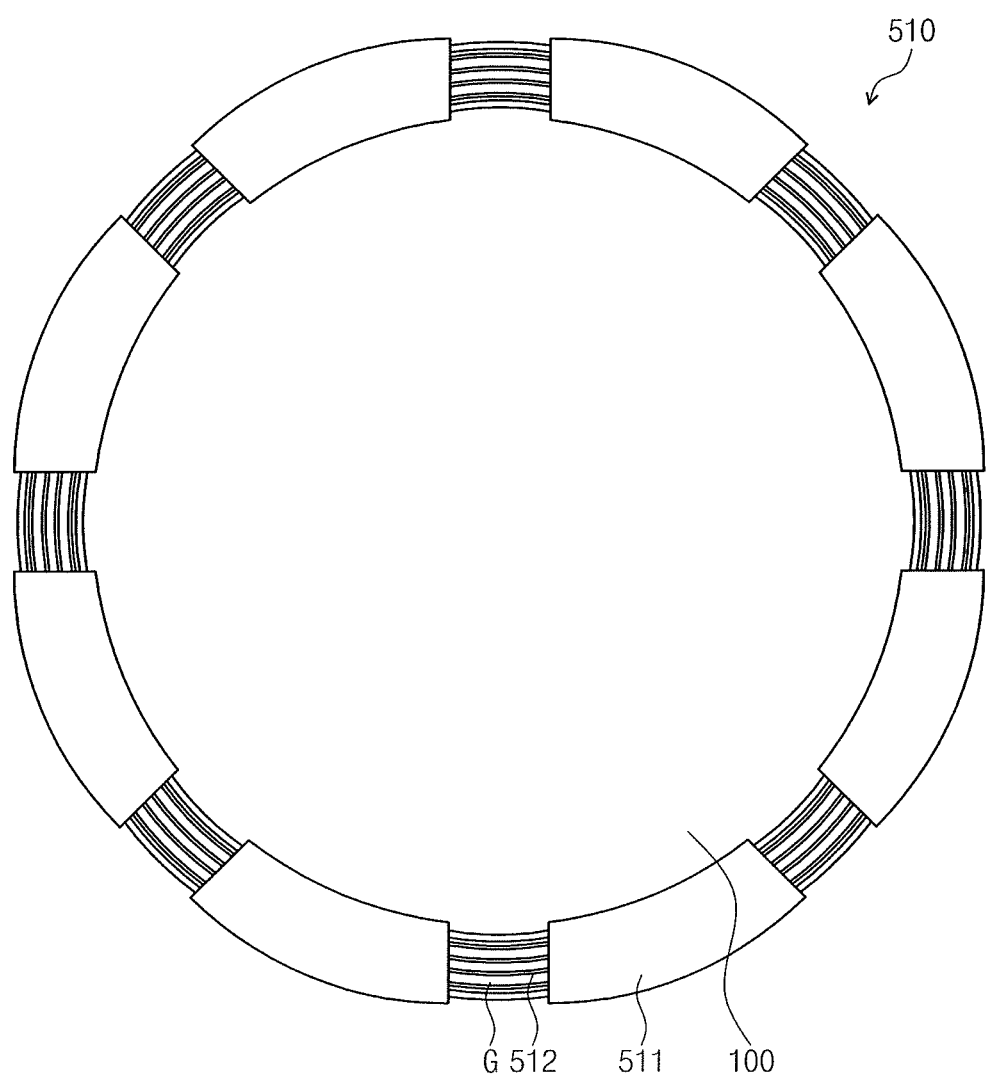
FIG. 8A-8B illustrate another embodiment of a case unit.

FIG. 8A is a front view of the case part 500 after the display apparatus is stretched. Referring to FIG. 8A, as the case units 500' move to the outside, adjacent case units 500' become spaced apart from each other. Thus, as the display part 100 is stretched, the radius of the display part 100 is increased. Accordingly, the case units 500' in contact with each other may be spaced apart from each other. As the case units 500' are spaced apart from each other, the inner cases 512 accommodated in the outer cases 511 may be drawn out to be exposed. The inner cases 512 function to connect the outer cases 511 that are spaced apart from each other.

Figure 8B:
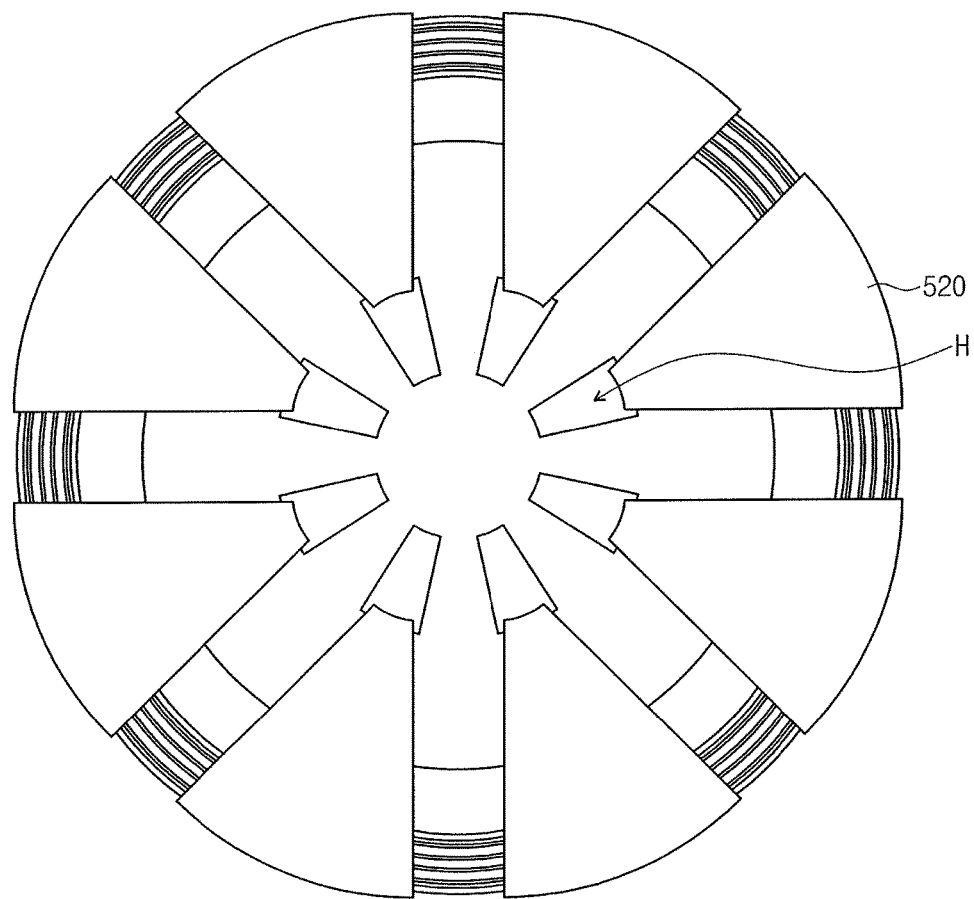

FIG. 8B is a rear view of the case part 500 after the display apparatus is stretched. Referring to FIG. 8B, as the case units 520' move to the outside, adjacent lower cases 520 become spaced apart from each other. When the case units 500' are viewed from a rear side, the inner cases 512 and predetermined regions of the guide part 400 are exposed between the spaced-apart lower cases 520.

As a result, in the display apparatus 1000, the movable members 200 are rotated by the rotation part 300 and the case part is moved to the outside by the rotated movable members 200. The display part 100 may be stretched by a force applied thereto, which pulls the display part 100 to the outside by the case part 500. Accordingly, the stretchable display part 100 may be easily stretched and thus the display apparatus may be easily stretched.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A display apparatus, comprising:
a stretchable display panel, the display panel including a display region to display an image and a non-display region adjacent the display region and accommodated in the case sections;
a plurality of movable surfaces adjacent the display panel;
an actuator connected to rotate the movable surfaces in a direction, and
a plurality of case sections accommodating the movable surfaces and the actuator, the case sections connected to a border of the display panel, the movable surfaces to rotate about a center axis in a predetermined region in order to push the case sections in an outward direction, wherein:
the actuator includes a plurality of rotators connected to each other, each of the rotators including a first gear having a plate shape connected to a lower surface of one of the movable surfaces and a second gear having a plate shape adjacent to the first gear,
the first and second gears are horizontally and alternately disposed in a circumferential direction,
the first gear includes a side surface with first protrusions,
the second gear including a side surface with second protrusions that engage the second protrusions,
at least one of the rotators includes a power driver to impart power to the rotators,
each of the rotators includes a first support to support the first gear and a second support to support the second gear, and
the power driver is connected to the first support of at least one of the rotators, the power driver including a driver to provide power, a third gear having a plate shape substantially perpendicular to the first gear, a third support to support the third gear, and a power transfer arrangement to transfer the power from the power driver to the third gear, the third gear to transfer the power from the power transfer arrangement to the first gear.

2. A display apparatus, comprising:
a stretchable display panel, the display panel including a display region to display an image and a non-display region adjacent the display region and accommodated in the case sections;
a plurality of movable surfaces adjacent the display panel;
an actuator connected to rotate the movable surfaces in a direction, and
a plurality of case sections accommodating the movable surfaces and the actuator, the case sections connected to a border of the display panel, the movable surfaces to rotate about a center axis in a predetermined region in order to push the case sections in an outward direction, and,
a guide under the actuator, wherein the guide includes a first region having a circular border including the actuator, a second region at a center of the region surrounded by the first region, and a third region between the first and second regions and including a plurality of holes extending from the second region toward the first region, wherein:
the actuator includes a plurality of rotators connected to each other, each of the rotators including a first gear having a plate shape connected to a lower surface of one of the movable surfaces and a second gear having a plate shape adjacent to the first gear, and
the first and second gears are horizontally and alternately disposed in a circumferential direction.

3. The apparatus as claimed in claim 1, wherein the display panel has substantially a circular shape.

4. The apparatus as claimed in claim 1, wherein each of the movable surfaces have substantially a water drop shape or a polygonal shape.

5. The apparatus as claimed in claim 1, wherein the display panel includes:
a display region to display an image; and
a non-display region adjacent the display region and accommodated in the case sections.

6. The apparatus as claimed in claim 2, wherein the case sections include:
a plurality of respective upper cases accommodating the non-display region of the display panel; and
a plurality of respective lower cases under the upper cases and accommodating the movable surfaces, the actuator, and the guide, wherein the upper and lower cases have substantially circular frame shapes.

7. The apparatus as claimed in claim 6, wherein:
the upper cases include:
a plurality of respective outer cases connected to the lower cases, and
a plurality of respective inner cases inside the outer cases,
the outer cases are respectively connected to the inner cases to have integrated shapes, and
the inner cases are drawn out from the outer cases and exposed when the display panel is stretched.

8. The apparatus as claimed in claim 7, wherein the outer case includes:
a first opening at a side surface of the outer case facing the display region of the display panel; and
a first accommodating region adjacent the first opening and disposed inside the outer case, wherein:
the inner case is in the first accommodating region and includes a second accommodating region extending from a side surface of the inner case facing the display region of the display panel to the inside of the inner case, and
the non-display region of the display panel passes through the first opening and is inserted into the second accommodating region.

9. The apparatus as claimed in claim 8, wherein:
the outer cases and the lower cases are to move toward the outer side of the case sections when the display panel is stretched;
as the outer and lower cases move toward the outer side of the case sections, adjacent ones of the outer cases and adjacent ones of the lower cases are to space apart from each other; and as the outer cases space apart from each other, the inner cases are drawn out from the outer cases to connect the outer cases.

10. The apparatus as claimed in claim 9, wherein:
the outer case has an inner side surface with an embossed protrusion;
the inner case has an outer side surface with an engraved groove; and
the embossed protrusion and the groove extend in a circumferential direction of the outer case and the protrusion engages the groove.

11. The apparatus as claimed in claim 9, wherein the lower case includes:
a bottom accommodating the first region of the guide and extending in a horizontal direction;
a side wall at a first side of the bottom in a radial direction and extending upwardly to connect to an outer side of the outer case; and
a catching protrusion at a second side of the bottom in the radial direction and protruding upwardly, wherein:
the catching protrusion is inserted into the holes of the guide, and
as the case sections space apart in an outward direction, the catching protrusion is to move from the second side to the first side of the radial direction in the holes.

\* \* \* \* \*